United States Patent [19]
Hedrick et al.

[11] 3,993,709
[45] Nov. 23, 1976

[54] POLYESTER INITIATED ANIONIC CATALYZED POLYMERIZATION OF LACTAM

[75] Inventors: Ross M. Hedrick, Creve Coeur; James D. Gabbert, St. Louis, both of Mo.

[73] Assignee: Monsanto Company, St. Louis, Mo.

[22] Filed: Nov. 7, 1975

[21] Appl. No.: 629,823

Related U.S. Application Data

[62] Division of Ser. No. 482,532, June 24, 1974, Pat. No. 3,944,629.

[52] U.S. Cl. .................. 260/857 PE; 260/78 L; 260/857 PG; 260/857 D
[51] Int. Cl.² .................. C08L 77/00; C08G 69/44
[58] Field of Search ............... 260/857 PG, 857 PE, 260/78 L

[56] References Cited
UNITED STATES PATENTS

| | | | |
|---|---|---|---|
| 3,366,608 | 1/1968 | Lincoln | 260/78 L |
| 3,384,681 | 5/1968 | Kobayashi | 260/857 PG |
| 3,522,329 | 7/1970 | Okazaki | 260/857 PG |
| 3,549,724 | 12/1970 | Okazaki | 260/857 PG |
| 3,636,135 | 1/1972 | Garforth | 260/857 PG |
| 3,639,502 | 2/1972 | Okazaki | 260/857 PG |
| 3,655,821 | 4/1972 | Lofquist | 260/857 PG |

*Primary Examiner*—Paul Lieberman

[57] ABSTRACT

A process for preparing lactam-polyol-polyacyl lactam or acyl polylactam terpolymers having ester end group termination and both ester linkages and amide linkages between the monomeric segments. The terpolymers are prepared by initiating the anionic catalyzed polymerization with a polyester initiator formed from dicarboxylic acid esters and aliphatic polyols and/or aliphatic polyether polyols.

14 Claims, No Drawings

POLYESTER INITIATED ANIONIC CATALYZED POLYMERIZATION OF LACTAM

This is a division of application Ser. No. 482,532 filed June 24, 1974, U.S. Pat. No. 3,944,629.

The invention relates to a process for preparing polyester initiated lactam-polyol-polyacyl lactam or acyl polylactam terpolymers having ester end group termination.

BACKGROUND OF THE INVENTION

Polyamides comprise a large class of polymers having a wide range of properties. Many polyamides have excellent combinations of properties for particular applications. One important class of polyamides are the polylactams prepared by the polymerization of lactams such as caprolactam and the like. Polycaprolactam, more commonly known as nylon 6, is the most widely used of the polylactams because of its excellent mechanical and physical properties and its low cost. Because of the many desirable properties of polylactams, polylactams other than polycaprolactam have been used to a considerable extent when nylon 6 is unsuited to some specific end use. Nylon 12, manufactured from lauryllactam or 12-aminododecanoic acid, is an example of such a polymer. The foregoing polymer is characterized by lower water absorption and consequently better dimensional stability and electrical properties than nylon 6. Nylon 12 is also more flexible and lower melting than nylon 6.

For still other applications, a polyamide having a higher water absorption coupled with a higher elasticity than nylon 6 would be useful for a number of applications. Some nylon copolymers are known to provide the characteristics just mentioned. Polyamide-polyether copolymers are known to have a combination of properties making them suitable for use as fibers, fabrics, films, foams, and molded articles. It is also known that lactam-polyol copolymers can be prepared by the base catalysts of lactams in the presence of polyalkylene glycols or other polymerizable polyol intermediates using isocyanate initiators. This method of polymerization yields a block copolymer with a number of good properties at a reasonable cost. One of the principal disadvantages of the polylactam-polyether copolymers prepared by this method has been the poor heat stability of the copolymers.

Accordingly, it would be highly desirable to provide terpolymers of lactam having properties of improved heat stability and properties not anticipated by simple end-chaining of long blocks of polylactam structure onto existing polymers. It would also be desirable to modify the properties of a terpolymer in the direction of elastomeric or crystalline materials depending upon the reaction amounts of the monomeric segments utilized in the polymerization process.

SUMMARY OF THE INVENTION

If a means could be found for improving the heat stability of lactam-polyol copolymer prepared by an anhydrous base catalyzed polymerization as well as providing a means for producing terpolymers of variable crystalline or elastomeric content, it would represent a significant advance in the state of the art. Providing a heat-stable terpolymer constitutes one of the objects of the invention. Providing a process for preparing polyether-polyester initiated lactam terpolymers constitutes another of the objects of the invention.

The present invention pertains to a process for preparing lactam-polyol-polyacyl lactam or acyl polylactam terpolymers having ester end group termination and both ester linkages and amide linkages between the monomeric segments of the terpolymer. The invention also pertains to the process and the terpolymers produced by initiating the anionic catalyzed polymerization of lactam with a polyether-polyester initiator formed from dicarboxylic acid esters and aliphatic polyols or aliphatic polyether polyols.

DESCRIPTION OF THE PREFERRED EMBODIMENTS

The polymerized lactam component of the above polymers is formed from cyclic monomeric lactams of the formula

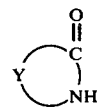

where Y is an alkylene group having at least about three carbon atoms, preferably from about 3 to 12 or 14, and more preferably from about 5 to about 11 carbon atoms. A preferred monomer is $\epsilon$-caprolactam. Lactam monomers in addition to $\epsilon$-caprolactam include alpha-pyrrolidinone, piperidone, valerolactam, caprolactams other than the $\epsilon$-isomer, capryllactam, lauryllactam and the like. In addition to lactams unsubstituted on their carbon chains, lactams having substituents on the carbon chain which do not inhibit or otherwise adversely affect the polymerization of the lactam are also included within the scope of the invention.

During polymerization the cyclic lactam ring is opened to provide the following monomeric unit $$-\overset{O}{\underset{\|}{C}}-Y-NH-$$

which, together with other lactam molecules, produces a polymeric block of the formula

where $x$ is an integer greater than one.

The monomeric lactam unit can also react with the polyacyl alkoxide. Similarly, a polylactam block, when joined with a polyacyl unit forms a polymer segment of the formula

where
R is a hydrocarbon group described hereinbelow, A and A' are acyl groups,
$x$ is an integer greater than one, $y$ is an integer equal to or greater than one, and $b$ is an integer equal to zero or one.

Thirdly, in the course of the polymerization of the components described above, a polyol can react with the polymerizable lactam unit or block to produce a polymer segment of the formula

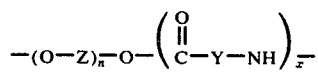

where x and n are integers equal to at least one and where Z is a hydrocarbon, substituted hydrocarbon or acylated hydrocarbon group which, together with the oxygen atom attached thereto, forms a polyether or polyester segment of a polymer molecule.

The Z hydrocarbon, substituted hydrocarbon and acylated hydrocarbon groups can be of any size even polymeric such as polybutadiene, generally limited to about six carbon atoms, said groups being preferably alkylene, arylene, alkylene carbonyl, arylene carbonyl, and mixtures thereof. Even more preferred are unsubstituted aliphatic groups such as methylene, ethylene, propylene, butylene and the like. Other suitable Z groups include phenylene, chlorophenylene, tolylene, isobutylene, isopropylene, ethylcarbonyl, propylcarbonyl, ethylsulfonyl, propylthiocarbonyl and the like.

The preference indicated above for unsubstituted aliphatic Z groups means that terpolymers of this invention which contain polyether segments are preferred over other embodiments which contain polyester segments.

In preferred aspects of this invention, it is theorized that the lactam is present in the polymer in the form of polylactam blocks which are alternated with blocks of polyol and polyol segments to form the polymer. The polylactam blocks when present can be of any size but customarily have molecular weights of at least about 500, preferably at least about 1000.

The polymerized polyol components of the polymers of this invention are formed from polyol intermediates having at least two hydroxy groups. Available commercial polyols of this class are produced by reacting, for example, propylene oxide or ethylene oxide with glycols, glycerol, pentaerythritol, glucose, amines, and the like. Included within the scope of the above class are a large number of suitable compounds ranging from the simple diols such as ethylene glycol to complex polymeric polyols such as poly ( ε-caprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propanediol, 1,3-propanediol, 1,3-hexanediol, 1,5-pentanediol, butylene glycol, 1,4-butanediol, dicyclopentadiene glycol, heptaethylene glycol and isopropylidene bis (p-phenyleneoxypropanol-2); diols other than alkylene glycols such as pyrocatechol, resorcinol, hydroquinone, hydroxyethyl acrylate and hydroxypropyl methacrylate; polyols having more than two hydroxy functions such as glycerol, pentaerythritol, 1,2,6-hexanetriol, 1-trimethylol propane, pyrogallol and phloroglucinol; polymeric polyols such as polyethylene glycols, polypropylene glycols, polyoxypropylene diols and triols, castor oils, polybutadiene glycols and polyester glycols, and a large number of compounds containing substituents other than hydroxy groups such as 2,4-dichlorobutylene glycol and 2,2'-4,4' bis (chlorohydroxyphenyl) ether. In addition to all the hydroxy compounds set forth above, the thio compounds analogous to the above compounds having sulfur atoms in place of oxygen are also included within the scope of the invention. A few examples include hydroxyethyl thioglycolate, ethylene glycol bis-(thioglycolate), pentaerythritol tetrakis-(thioglycolate) and thiodiglycol.

If the polyol intermediate is a polymer, the molecular weight of the polyol can be any amount. Commercially available polymeric polyol compounds have molecular weights from 200 to 5000, but polymers with molecular weights outside that range are also useful in the practice of the instant invention. If the polyol intermediate or segment is a single molecule having at least two hydroxy groups such as ethylene glycol, a suitable polyol segment according to the invention would have a molecular weight of at least 62.

The third component of the terpolymers of this invention has the following structural configuration in the polymer chain:

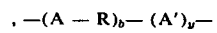

where R is a hydrocarbon group, A and A' are acyl radicals, y is an integer equal to at least one, and b is an integer equal to zero or one.

The R group can be any hydrocarbon group having at least two valence bonds for attachment to the acyl groups shown in the above formula. Examples include functional groups obtained by the removal of hydrogen atoms from methane, ethane, propane, hexane, dodecane, benzene, toluene, cyclohexane and the like. The polyvalent R group can be of any size but is preferably limited to about 20 carbon atoms, and more preferably about eight carbon atoms. If the integer "y" is one, the linkage will be a diacyl group. The A group can be any acyl group and preferably are

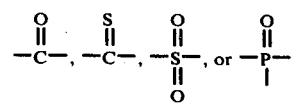

groups. Most preferred among the above groups is the carbonyl group.

Values for the integer "y" have a direct relationship to the thermoplasticity of the terpolymer. If the integer "y" is greater than one, the linkage will be a higher polyacyl. The higher the value of "y", the more highly crosslinked will be the finished polymer. Values for "y" can be as high as six or eight, but more preferably do not exceed two or three.

The polymerized product comprising the aforementioned components can have a number of different structures depending upon the process conditions and the relative proportions of ingredients used in the reaction system. Polymers can be prepared having relatively small segments of lactam units joined to similarly short segments of polyol units through the polyacyl linkage described above. Or large segments of one polymeric component can be combined with a larger number of comparatively small segments of another polymeric unit, which small segments are joined to one another through the polyacyl linkage as well as to the other type of polymeric component. Or segments of varying sizes of both the lactam and the polyol polymeric units can be combined through the polyacyl components to form a highly random terpolymer. Another form of polymer within the scope of this invention are block polymers, where moderately large size blocks or segments of the lactam and polyol polymeric units are positioned alternately in the polymer chain and joined through the polyacyl group described above. If the polyacyl linkages are, for purposes of simplification, considered to be a part of either a lactam or polyol block, then the block polymers of this invention can be discussed in terms of two alternating blocks designated as A and B blocks, instead of in terms of complicated patterns of three blocks designated as A, B and C blocks. Block polymers prepared according to this invention can have three general structural configurations, AB, ABA and a repeating pattern of AB segments. Following a general characterization of a block copolymer prepared within the scope of this invention as AB, ABA or repeating AB, it should be recognized that the exact structural configuration may vary somewhat from the general characterization of the polymer. As an illustration, one theoretical formula for a lactam-polyolpolyacyl lactam block terpolymer of the repeating AB type could be ular weights of at least about 500, preferably at least about 1000. The ratio of the number of lactam to polyol blocks can also vary. Since the block polymers can be of either the type designated as AB, ABA or repeating AB, the ratio of lactam blocks to polyol blocks can vary from 2:1 to 1:1 to 1:2. Mixtures of two or more block polymers having different ratios of the lactam and polyol blocks will produce ratios of polymer blocks intermediate between the above stated ratios.

In the above theoretical formula for a lactam-polyol block terpolymer, the polyacyl linkage is represented as located between two lactam polymer segments as well as between a polyether segment and a lactam polymer segment. As a practical matter, the polyacyl linkages will also be located occasionally between two polyol blocks. It should be noted, moreover, that the polyacyl linkages need not invariably be positioned between lactam and polyol blocks since the necessary linkage can be provided in the form of an ester linkage

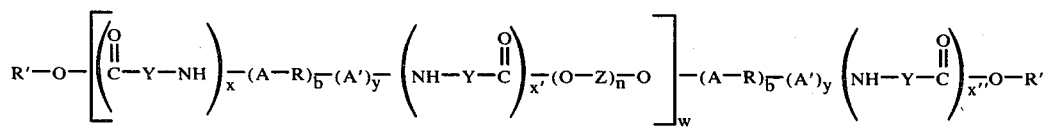

where $y, x, x', x'', n$ and $w$ are all integers equal to one or more; $b$ is an integer equal to zero or one; R is a divalent or polyvalent hydrocarbon group; $(O-Z)_n$ is a polyol segment or a polymeric moiety and Z is a hydrocarbon or substituted hydrocarbon group; Y is an alkylene group having at least three carbon atoms; A and A' are acyl groups; and R' is an aliphatic or substituted aliphatic hydrocarbon wherein the ester group is attached to other than an aromatic radical.

If for instance Y is a straight chained alkylene group, A and A' are carbonyl groups, Z is ethylene, $-CH_2CH_2-$, and R is phenylene, the terpolymer would be a caprolactam-ethylene glycol polymer where the caprolactam segments of the polymer are joined to one another and to the ethylene glycol segments through terephthaloyl linkages. Other lactam-polyol polymers, both of the AB, ABA as well as the repeating AB type, will become immediately apparent to those skilled in the art in view of this disclosure. It should therefore be noted that the above structural formula is set forth for illustrative purpose only, and is not intended as a limitation of the polymers within the scope of the invention.

When the polymers of this invention are of the ABA type, where one block of one type of polymer segment is located between two blocks of the other type of polymer segment, the polymers can be of either the polyol-lactam-polyol type or the lactam-polyol-lactam type. Of the two types, the latter is a preferred type of ABA polymer.

If the lactam-polyol-polyacyl lactam polymer is a block polymer, the polyol blocks can, like the polylactam blocks, be of any size but customarily have molecby the oxygen atom of the polyether segment and the carbonyl group of a polylactam segment.

Following is a general characterization of the lactam polyolpolyacyl lactam terpolymer produced according to the invention. As an illustration, the lactam-polyolpolyacyl lactam or acyl polylactam terpolymer has the general formula:

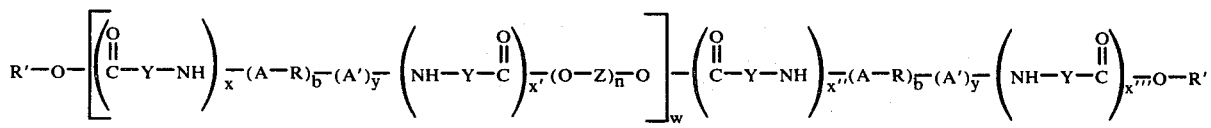

Wherein $(O-Z)_n$ is a polyol segment or a polymeric moiety and Z is a hydrocarbon or substituted hydrocarbon group said group being alkylene, arylene, alkylene carbonyl, arylene carbonyl, and mixtures thereof;
A and A' are acyl groups selected from

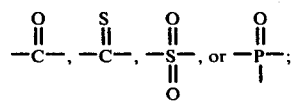

R is a polyvalent hydrocarbon group;
Y is an alkylene or substituted alkylene having from about 3 to about 14 carbon atoms; $y$ is an integer equal to at least one, and $b$ is an integer equal to zero or one; $x, x', x''$, and $x'''$ are integers and the total number of $x$'s is equal to $2w + 2$; and $n$ and $w$ are integers equal to one or more.

As mentioned earlier, the terpolymers of this invention are characterized by the presence of both ester and amide linkages between the monomeric segments of the polymer. The term "monomeric segment" is intended to apply to the polymerized reaction product of a monomer, whether the reaction product is a single unit such as

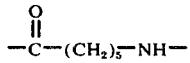

or a block of several units such as

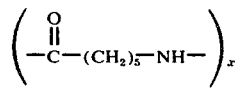

Regarding the breadth of the terms "ester linkage" and "amide linkage", the linkages can of course be composed of acyl groups other than carbonyl groups since the polyacyl linkage described above includes thiocarbonyl, sulfonyl, and phosphoryl groups as well as the more conventional carbonyl groups.

The molecular weight of the terpolymers can vary widely from a number average molecular weight of just a few thousand to 1 million or higher. For thermoplastic uncrosslinked polymers, a preferred range for number average molecular weight is from about 10 or 20,000 to about 100,000 to 200,000. If the polymers are crosslinked, the molecular weights of the polymers can be much higher in the range of 100,000 to several million.

When block polymers are formed, the molecular weight of the polyol blocks is an important consideration in selecting preferred polymers within the scope of this invention. Polyol blocks having a number average molecular weight of about 500 or 600 or more generally tend to have good low temperature properties. This lower level of molecular weight for the polyol blocks is subject to some variation insofar as low temperature properties can also be affected by the degree of block polymerization, the nature of the block polymer, i.e. AB, ABA or repeating AB, the ratio of the lactam content to the polyol content, and the particular lactam and polyol present in the polymer. Polyol segments having a molecular weight of at least 62 can also constitute a portion of the terpolymer as well as the polyol blocks having molecular weights of 500 to 600 or greater. For example, ethylene glycol as the polyol segment provides a terpolymer having improved tensile elongation and impact resistance. Regarding a maximum molecular weight of the polyol blocks, preferred polymers have polyol blocks with a maximum number average molecular weight of about 6000, and more preferably about 4000. Above these levels the polyol prepolymer tends to exhibit a reduced hydroxyl functionality, due to unsaturation, thereby making more difficult the incorporation of polyol into the polymer.

In addition to the three principal monomeric constituents which together produce the terpolymers of this invention, other polymerizable monomers can also be used to prepare polymers having four or more polymerizable constituents. As an example, if the polyol constituent of a terpolymer of this invention is polybutadiene diol, the resultant terpolymer could be, after the lactam-polyol-polyacyl lactam polymerization, subsequently reacted with a vinyl compound such as styrene to crosslink the polymer through its vinyl unsaturation. Still other monomers could be chosen which could be polymerized directly into a linear polymer chain. The quantity of such additional monomers could be very large, even as great as 50% or more of the total polymerizable constituents but preferably is limited to quantities of 25% or less of the total monomer content.

The polymers prepared according to this invention exhibit a broad range of properties which can be adjusted to provide compositions particularly well adapted for a specified end use. In addition to crosslinking, adjustment of polymer structure, and molecular weight adjustment of polymer blocks, other means of varying the properties of the polymers can also be employed. Crystallinity of the polymers, which can be present in the lactam segments of the polymers, can be increased or decreased by variation of polymerization temperatures. Since any crystallinity in the polymers of this invention is largely present in the lactam segments of the polymer, variation of the lactam content of the polymer can also result in a variation of polymer crystallinity. Polymers with relatively high degrees of crystallinity tend to be strong, rigid polymers whereas those with little or no crystallinity are more elastomeric in nature.

As mentioned earlier, the type of lactam, polyol and polyacyl lactam components can also affect the properties of the finished polymer. As an example, polyethylene glycol polymer segments tend to produce polymers with a high water absorptivity whereas polypropylene glycol or polytetramethylene glycol polymer segments produce polymers with comparatively low water absorptivities. As another example, caprolactam polymer segments in the polymers of this invention produce polymers which are stronger and more rigid than homologous polymers containing segments of a higher lactam such as capryllactam or dodecanolactam. Even more significantly, use of a lactam will yield an essentially linear polymer whereas use of a tris or tetrakislactam will result in a branched or crosslinked terpolymer. Similarly bis-lactams can be employed to produce a branched or crosslinked polymer. High crosslinked polymer can be made through the use of polyols having more than two hydroxy groups.

With all the foregoing techniques available for modifying and adjusting the properties of the polymers of this invention, it can be appreciated that the polymers can be used in a number of end use applications. One such use is a textile fiber. Throughout the entire range of ratios of polymeric components, from polymers containing very little polyether component to those containing a large amount, the polymers have properties which make them useful as textile fibers. In addition to being the sole constitutent of a textile fiber, the terpolymers can also be used as one component in a composite or conjugate fiber. It is contemplated that conjugate fibers of nylon and the terpolymers of this invention will be particularly useful in a number of textile and other applications. Other textile applications for the terpolymers include their use in the manufacture of non-woven fabrics and as high moisture regain fibers. The terpolymers can also be manufactured into foamed articles, either during or after their polymerization, to produce rigid and flexible foams. Because of their method of preparation directly from the monomeric components, the polymers can be prepared in large shapes such as furniture and furniture components and automobile parts. The terpolymers can also be produced in the form of molding resins which can subsequently be molded by injection molding, extruding, thermoforming or other techniques to produce products of virtually any shape. The more highly elastomeric compositions can be used in manufacture of automobile tires and tire components. The polymers can also be modified with fillers, fibers, pigments, dyes, stabilizers, plasticizers, flame retardant and other polymeric modifiers to alter their properties and thereby enlarge even further the scope of their applicability. One such modification comprises reinforcing the polymers with fillers or fibers which have been treated with coupling agents capable of increasing the bonding of the fillers or fibers to the polymer molecules. A large number of organosilane compounds have been found to be especially capable of performing this task of improving adhesion between polymer and filler or fiber. Examples of some suitable organosilane couplers for use with the polymers of this invention include 3-aminopropyl triethoxysilane, glycidoxypropyl trimethoxysilane and N-trimethoxysilylpropyl-N-beta-aminoethyl-amine. Preferred fillers and fibers include quartz, wollastonite, feldspar, calcined kaolin clay, glass fibers and other high performance fibers such as graphite, boron, steel and the like. The concentrations of fillers and fibers can vary from very small amounts such as one or two volume percent up to 70 or 80 volume percent or more.

The terpolymers are prepared by either initiating the anionic catalyzed polymerization of lactam with a polyether-polyester prepolymer initiator, or the formation of the initiator from dicarboxylic acid esters and aliphatic polyols or aliphatic polyether polyols in the presence of lactam as a reaction solvent, followed by the anionic catalyzed polymerization of the lactam. As an illustration, one theoretical formula for the terpolymer is presented as a result of the following formulation schematic of a typical process according to the invention.

drocarbon group; Y is an alkylene group having at least about three carbon atoms, preferably from about 3 to 12 or 14 carbon atoms; and R is a divalent hydrocarbon; and n is an integer equal to one or more. The foregoing illustration represents only one typical formulated schematic of the inventive process and terpolymer produced thereby, and should not be construed as the only process and/or terpolymer afforded by this invention.

The polyether-polyester prepolymer initiators result from the transesterification of aliphatic polyols and/or aliphatic polyether polyols and dicarboxylic acid esters. The dicarboxylic acid esters or dialkyl esters useful in the prepolymer formation have the general formula:

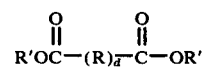

wherein R' is an alkyl such as methyl, ethyl, propyl, isopropyl, butyl, isobutyl, 2-ethyl hexyl and the like,

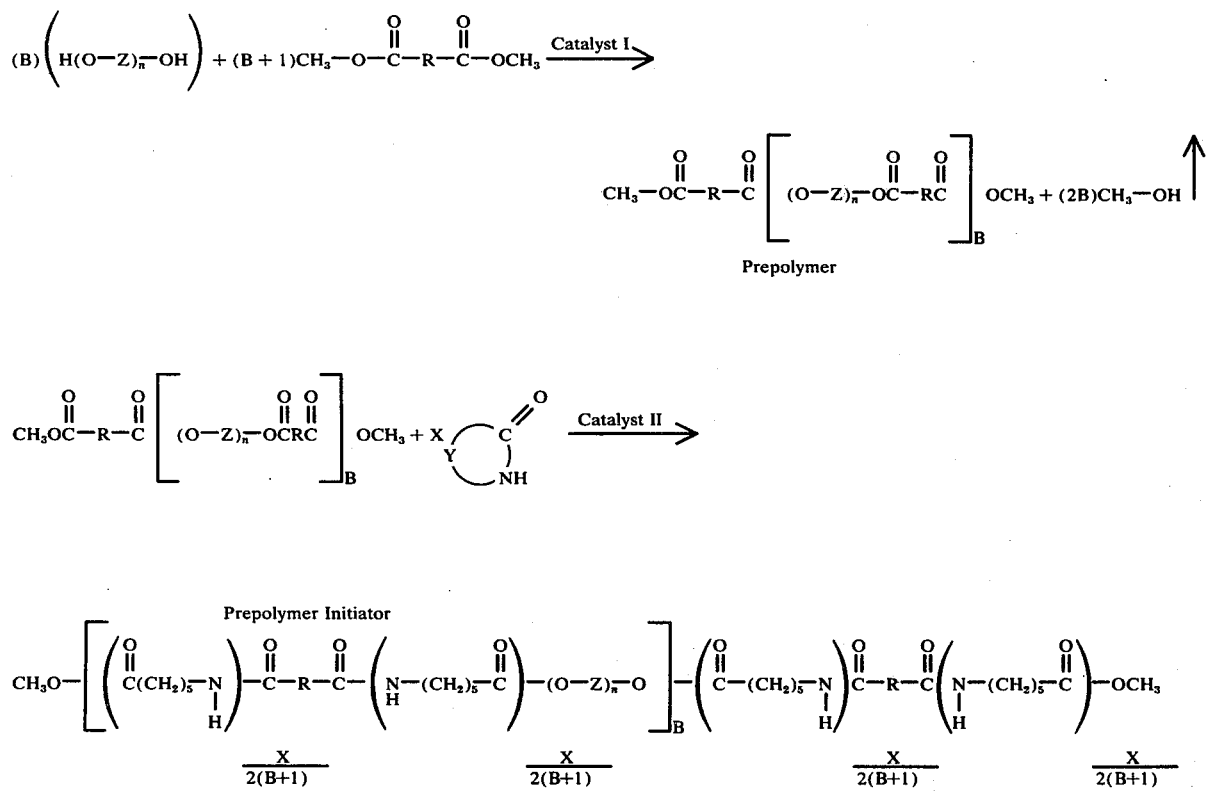

where X and B are integers equal to at least one; Z is a hydrocarbon, substituted hydrocarbon or acylated hydrocarbon, alkenyls, aryls and mixtures thereof; d is an integer; and when the radical $$-O-\overset{O}{\underset{\|}{C}}-(R)_d-\overset{O}{\underset{\|}{C}}-O-\text{ is}$$

terephthalate, R is represented by 

isophthalate, is represented by 

| | |
|---|---|
| oxalate | —; |
| malonate | —CH$_2$—; |
| succinate | —C$_2$H$_4$—; |
| glutarate | —C$_3$H$_6$—; |
| adipate | —C$_4$H$_8$—; |
| pimelate | —C$_5$H$_{10}$—; |
| suberate | —C$_6$H$_{12}$—; |
| azelate | —C$_7$H$_{14}$—; |
| sebacate | —C$_8$H$_{16}$—; | and the like. Specific dialkyl esters according to the above formula include, for example, dialkylaryloates such as dimethyl terephthalate and dimethyl isophthalate; and dialkylalkanoates such as diethyl sebacate, dibutyl adipate, diethyloxalate and the like.

The catalysts used as Catalyst I in the foregoing illustration of a typical formulated schematic of the inventive process are transesterification prepolymer catalyst, for example alkali metals and alkaline earth metals, zinc, cadmium, manganese, iron, nickel, cobalt, tin, lanthanum, lead or bismuth or combinations thereof, salts such as calcium, manganese, cobalt or zinc acetate, lithium hydride, sodium alcoholates, zinc succinate or zinc acetyl acetonate, oxides such as lead oxide (PbO), antimony oxide (Sb$_2$O$_3$), or germanium oxide (GeO$_2$), magnesium methoxide, and combinations such as antimony trioxide/manganese acetate or antimony trioxide/titanium dioxide. Other suitable catalyst include caprolactam magnesium bromide, and selected Grignard agents, for example, ethyl magnesium bromide. Catalyst I is used in quantities of from about 0.005 to about 0.2% by weight, preferably about 0.01 to about 0.10% by weight based on the quantity of dicarboxylic acid ester.

Polymerization temperatures can vary from the melting point of the lactam or less up to the melting point of the resultant polymer or more. Depending upon the particular ingredients being used, this can encompass a range from 70° to 230° C or more. Preferred polymerization temperatures are from about 90° to about 190° C and more preferably from about 120° to about 180° C for caprolactam terpolymers. Such a technique produces desired polymerization of a terpolymer having high strength and modulus.

Times required for complete polymerization will vary considerably depending upon polymerization temperatures and the specific ingredients used in the polymerization system. Polymerization time varies from at least about one minute, preferably from 1 to 30 minutes, and can be extended to any duration up to several days or more. Generally, polymerization times of from 1 to 30 minutes are preferred for most polymerization systems.

The lactam monomer, dicarboxylic acid ester and polyol used in the polymerization have both been described in ample detail above. The lactam polymerization catalyst (Catalyst II) useful herein includes that class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates and the like.

Also useful are a number of organometallic compounds of the metals mentioned above such as metal alkyls, metal phenyls, metal amides and the like. Examples include sodium hydride, potassium hydroxide, lithium oxide, ethyl magnesium bromide, calcium fluorohydride, strontium carbonate, barium hydroxide, methyl sodium buthyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metals or metal compounds with lactam monomer in the polymerization medium or by prior reaction of the metal or metal compound with a stoichiometric quantity of lactam monomer. Examples of metal lactam catalysts include sodium caprolactam, bromomagnesium caprolactam, magnesium caprolactam, bromomagnesium pyrrolidinone, chlorocalcium caprolactam and the like. Catalyst concentrations can range from a fraction of one mole percent to 15 or 20 or more mole percent of the lactam monomer to be polymerized.

The polyacyl linkage, as well as the ester and amide linkages, are incorporated into the polymer chain through the reaction of the polyacyl alkoxide with the lactam and polyol constituents. In the formula set forth above for the polyacyl alkoxide useful herein, the R group can be any hydrocarbon group having the necessary number of available valences to bond to itself all of the acyl groups included in the compound. The hydrocarbon group can be of any size but preferably contains a maximum of eight or ten carbon atoms. Examples of suitable R groups include phenylene, biphenylene, methylene, hexylene, tolylene, and analogous hydrocarbons having more than two sites available for bonding to acyl groups.

The amount of polyacyl alkoxide useful in the preparation of the terpolymers of this invention depends upon the quantities of lactam and polyol being used. For preferred polymerizations, it is desirable that the polyacyl alkoxide be present in an amount from 100 to about 500, preferably from about 100 to about 200, equivalent percent of the polyol. If the polyacyl alkoxide is present in an amount less than a molecularly equivalent amount based on the polyol, polyol prepolymer formation occurs, but the subsequent lactam polymerization is very slow. In those preferred polymerization systems where the polyacyl alkoxide concentration exceeds the amount stoichiometrically equivalent to the polyol, the excess can be from 0.01 to about 30 or more mole percent of the lactam monomer. A preferred range is from about 0.1 to about 10 mole percent of the lactam monomer, and more preferably from about 0.2 to about 5 mole percent of the lactam monomer.

The lactam and polyol can be present in any relative proportions ranging up to 99 parts of either component to 1 part of the other. Preferred ratios of the two polymer-forming materials depend upon the end use to which the finished polymer is to be put. For end use applications requiring strong rigid materials, the lactam content of the polymerizable medium should be relatively high such as 60 or 80 or even 90% or more lactam. For other applications where elastomeric properties such as high elongation or where water absorption is desirable, the relative proportions of the two monomers can be reversed so that the polymerizable medium will contain 60 or 80 or 90% or more of the polyol compound. Where water absorption is desired, polyethylene glycol can be used as the major polyol compound. Polymers containing about equal quantities of both lactam and polyol are preferred for a great many uses because of the advantageous combination of properties achieved by such polymers.

EXAMPLE 1

Three terpolymers were prepared using the quantities of ingredients listed in Table 1. In each of the processes listed, the polymeric polyol was heated under vacuum at 125°–180° for 30 minutes to dry. The transesterification prepolymer catalyst and DMT were added and the mixture stirred under a nitrogen atmosphere at 200° C. Intermittently a slight stream of nitrogen was allowed to pass through the reactor to remove evolved methanol. After 40 minutes reaction time the mixture was evacuated for 5–10 minutes. To the resulting prepolymer was added caprolactam and Santowhite Powder. The temperature of the resulting prepolymer-caprolactam solution was adjusted to 160° C and Grignard reagent added. The mixture was evacuated for 2–3 minutes to remove ether and ethane. The vacuum was released to nitrogen and the catalyzed prepolymer solution poured into a vertical mold of 10 inches × 10 inches × ⅛ inch dimensions which had been heated to 160° C. After an hour the mold was opened and the sample removed. Tensile properties of the resulting terpolymers are reported in Table 2.

After the initial distillation of caprolactam, a reflux condenser was attached to the reaction flask and a vacuum take off with a dry ice cooled receiver attached to the condenser outlet. The DMT and transesterification catalyst were added and the reactor evacuated to reflux caprolactam at a temperature of 110°–140° C. Progress of the reaction was followed by measurement of evolved methanol. After methanol evolution had ceased, the temperature of the reaction mixture was adjusted to 130° C and 5 ml. Grignard reagent catalyst added. The reaction flask was evacuated for 2 minutes to remove ether and ethane and the vacuum released to nitrogen atmosphere. The catalyzed mixture was poured into a 160° C mold described in Example 1. After 1 hr the mold was opened and the sample removed. Tensile Properties of the resulting terpolymer are reported in Table 4.

Table 3

|   | Reactants | | |
|---|---|---|---|
|   | Carbowax[1] 4000 - | 90 gms | |
|   | Caprolactam | 229 gms | |
|   | Santowhite Powder | 1.5 gms | |
|   | DMT[2] | 7.7 gms | |
| II | Transesterification Catalyst | | |
|   | Terpolymer D | Grignard[3] | 0.6 ml |
|   | Terpolymer E | Aluminum isopropoxide | 0.2 gm |
|   | Terpolymer F | Cadmium Acetate | 0.26 gm |
|   | " G | Zinc Acetate | 0.22 gm |
|   | " H | Magnesium Methoxide[4] | 0.9 ml |
| III | Copolymerization Catalyst - Grignard[3] | | 5 ml. |

[1] Polyethylene Glycol
[2] Dimethyl Terephthalate
[3] Ethyl magnesium bromide - 3 molar in diethyl ether.
[4] 1 Molar in Methanol Table 1

| Process | Prepolymer Catalyst | | Glycol Used | | DMT[4] Gms | Caprolactam Gms. | SWP[5] Gms. | Grignard[6] ml. |
|---|---|---|---|---|---|---|---|---|
|   | Type | Amount | Compound | Gms | | | | |
| A | Magnesium Acetate[1] | 0.4 ml | Polymeg[3] | 2000 | 117 | 15.5 | 273 | 2 | 5 |
|   | Tetraisopropyl Orthotitanate[2] | 0.08 ml | | | | | | |
| B | Tetrabutyl Orthotitanate | 0.063 ml | Carbowax[7] | 4000 | 90 | 7.0 | 205 | 1.5 | 5 |
| C | Zinc Acetate | 0.2 gm | " | " | 90 | 7.7 | 205 | 1.5 | 5 |

[1] 0.1 Molar in Methanol
[2] 0.8 Molar in 2. Propanol
[3] Polytetramethylene Glycol
[4] Dimethyl Terephthalate
[5] Santowhite Powder
[6] Ethyl Magnesium Bromide 3 molar in Diethyl Ether
[7] Polyethylene Glycol Table 2

| Terpolymer | Tensile Fail Strength PSI | % Elongation | Tensile Modulus PSI |
|---|---|---|---|
| A - 30% PTMG | 6530 | 720 | 47,000 |
| B - 30% PEG | 7000 | 520 | 57,000 |
| C - 30% PEG | 6800 | 550 | 101,000 |

EXAMPLE 2

Five polyethylene glycol terpolymers were prepared from polyester prepolymers formed in caprolactam solution. The quantities of ingredients and the various transesterification catalysts used are listed in Table 3.

In each of the processes listed, the polymeric glycol, caprolactam and Santowhite Powder were heated under vacuum to distil 25 ml. caprolactam. (In process F and G, cadmium acetate dihydrate and zinc acetate dihydrate were added prior to caprolactam distillation. In the remaining processes, the transesterification catalyst was added after caprolactam distillation.)

Table 4

| Ter-polymer | Tensile Yield | | Tensile Fail | | Tensile Modulus PSI |
|---|---|---|---|---|---|
|   | Strength PSI | % Elongation | Strength PSI | % Elongation | |
| D |   |   | 6200 | 507 | 84,000 |
| E | 3700 | 15 | 5900 | 470 | 62,400 |
| F | 3700 | 25 | 6200 | 497 | 68,000 |
| G | 3800 | 20 | 6100 | 477 | 78,000 |
| H | 3700 | 25 | 6500 | 518 | 91,500 |

EXAMPLE 3

Several terpolymers were prepared employing different types and quantities of glycols. The terpolymers were prepared using the quantities of ingredients listed in Table 5. The transesterification reaction and copolymerization with caprolactam were run according to procedures described in Example 2. Tensile properties of the resulting terpolymers are reported in Table 6.

Table 5

| Process | Glycol Used Material | % in Copolymer | Prepolymer Catalyst Material | Amount | Gms Glycol | Gms DMT[1] | Gms Caprolactam Charge | Distilled | Stabilizer Material | Gms | ml. Grignard[2] |
|---|---|---|---|---|---|---|---|---|---|---|---|
| I | Polymeg[3] 2000 | 30 | Grignard[2] | 0.6 ml | 90 | 10.2 | 227 | 25 | SWP[4] | 1.5 | |
| J | Polymeg[3] 2000 | 50 | Mg(OCH$_3$)$_2$[5] | 1 ml | 150 | 16.0 | 164 | 25 | Flectol-H | 1.5 | 4.5 |
| K | Polymeg 1000 | 30 | Grignard | 0.6 ml | 90 | 19.6 | 221 | 25 | SWP | 1.5 | 5.0 |
| L | Polymeg 1000 | 40 | Grignard | 0.6 ml | 120 | 24.5 | 188 | 25 | SWP | 1.5 | 5.0 |
| M | Polymeg 650 | 30 | Grignard | 0.6 ml | 90 | 28.0 | 216 | 25 | SWP | 1.5 | 5.0 |
| N | Polymeg 650 | 40 | Grignard | 0.6 ml | 120 | 36.8 | 155 | 25 | SWP | 1.5 | 5.0 |
| O | { Polymeg 1000<br>Butane Diol | 21<br>6 | Grignard | 0.6 ml | 62.5<br>17.1 | 50.2 | 196.3 | 25 | SWP | 1.5 | 5.0 |
| P | Polyglycol[6] E-6000 | 50 | Mg(OCH$_3$)$_2$ | 1 ml | 150 | 5.0 | 171 | 25 | Flectol-H | 1.5 | 5.0 |
| Q | Polyglycol E-1450 | 50 | Zinc Acetate | 5 gm. | 1500 | 220.2 | 1446 | 100 | Flectol-H | 1.5 | 35 |
| R | Niax PCP-0240[7] | 30 | Mg(OCH$_3$)$_2$ | 1 ml | 90 | 10.8 | 227 | 25 | Flectol-H | 1.5 | 5.0 |
| S | Niax PCP-0240[7] | 40 | Mg(OCH$_3$)$_2$ | 1 ml | 120 | 13.7 | 195 | 25 | Flectol-H | 1.5 | 5.0 |
| T | { Polymeg 2000<br>Niax PCP 0240 | 30<br>5 | Mg(OCH$_3$)$_2$<br>Mg(OCH$_3$)$_2$ | 11 ml | 900<br>150 | 109.6 | 1975 | 100 | DNPD[8] | 6 | 50 |
| U | { Polymeg 2000<br>Niax PCP 0240 | 30<br>10 | Mg(OCH$_3$)$_2$ | 13 ml | 900<br>300 | 124.3 | 1814 | 100 | DNPD[8] | 6 | 50 |
| V | { Polymeg 2000<br>Niax PCP 0240 | 30<br>15 | Mg(OCH$_3$)$_2$<br>Mg(OCH$_3$)$_2$ | 14 ml | 900<br>450 | 139.0 | 1655 | 100 | DNPD | 6 | 50 |
| W | Voranol 2000[9] | 30 | Grignard | 0.6 ml | 90 | 7.7 | 229 | 25 | SWP | 1.5 | 5.0 |
| X | Voranol 2000[9] | 50 | Mg(OCH$_3$)$_2$ | 0.9 ml | 150 | 15.3 | 164 | 25 | SWP | 1.5 | 5.0 |

[1]Dimethyl terephthalate
[2]Ethyl magnesium bromide - 3 molar in diethyl ether
[3]Polytetramethylene glycol
[4]Santowhite powder
[5]Magnesium methoxide - 1 molar in methanol
[6]Polyethylene glycol
[7]Polycaprolactone diol
[8]N,N'-dl-2-Naphthyl-p-phenylene diamine
[9]Polypropylene glycol

Table 6

| Process | Terpolymer Composition | Tensile Yield Strength PSI | Tensile Yield % Elongation | Tensile Fail Strength PSI | Tensile Fail % Elongation | Tensile Modulus PSI |
|---|---|---|---|---|---|---|
| I | 30% PTMG 2000 | 4600 | 50 | 6870 | 533 | 89,400 |
| J | 50% PTMG 2000 | | | 4850 | 773 | 26,000 |
| K | 30% PTMG 1000 | 4700 | 60 | 5980 | 533 | 82,800 |
| L | 40% PTMG 1000 | | | 5190 | 776 | 25,700 |
| M | 30% PTMG 650 | | | 5850 | 685 | 38,300 |
| N | 40% PTMG 650 | | | 3100 | 754 | 15,400 |
| O | { 21% PTMG 1000<br>6% Butane Diol } | | | 2720 | 156 | 6,500 |
| P | 50% PEG 6000 | 3260 | 14 | 4400 | 588 | 61,000 |
| Q | 50% PEG 1450 | | | 2270* | 250* | |
| R | 30% Polycaprolactone | 2700 | 29 | 7100 | 715 | 40,000 |
| S | 40% Polycaprolactone | 2300 | 60 | 4000 | 650 | 27,200 |
| T | { 30% PTMG 2000<br>5% Polycaprolactone } | | | 6900* | 470* | |
| U | { 30% PTMG 2000<br>10% Polycaprolactone } | | | 5200* | 473* | |
| V | { 30% PTMG 2000<br>15% Polycaprolactone } | | | 5000* | 530* | |
| W | 30% PPG | | | 4790 | 340 | 82,800 |
| X | 50% PPG | | | 3190 | 482 | 28,800 |

*Tensile data for extruded strand

EXAMPLE 4

Two terpolymers were prepared from polyester synthesized from an aliphatic dibasic ester using the quantities of ingredients specified in the following table:

Table 7

| Terpolymer Process | Y | Z |
|---|---|---|
| Glycol Used | Polymeg[1] 2000 | Polymeg[1] 1000 |
| Reactants | | |
| gms. Glycol | 90 | 90 |
| gms. Santowhite Powder | 1.5 | 1.5 |
| gms. Caprolactam Charged | 225 | 218 |
| gms. Caprolactam Distilled | 25 | 25 |
| gms. Diethyl sebacate | 13.2 | 24.5 |
| ml. Mg(OCH$_3$)$_2$[2] | 0.9 | 1.0 |

Table 7-continued

| Terpolymer Process | Y | Z |
|---|---|---|
| ml. Grignard[3] | 5.0 | 5.0 |

[1]Polytetramethylene glycol
[2]1 molar in methanol
[3]Ethyl magnesium bromide — 3 molar in diethyl ether.

The terpolymers were prepared according to the procedure described in Example 2. Tensile properties of the terpolymers are reported in the following table:

Table 8

| Process | Terpolymer Composition | Tensile Fail Strength PSI | Tensile Fail % Elongation | Tensile Modulus PSI |
|---|---|---|---|---|
| Y | 30% PTMG 2000 | 7200 | 575 | 81,400 |

Table 8-continued

| Process | Terpolymer Composition | Tensile Fail Strength PSI | Tensile Fail % Elongation | Tensile Modulus PSI |
|---|---|---|---|---|
| Z | 30% PTMG 1000 | 5600 | 516 | 62,800 |

The following Example 5 is a calculated example of a predictable cross-linked terpolymer which could be prepared by the inventive process.

EXAMPLE 5

A crosslinked terpolymer is prepared using the quantities of ingredients listed in Table 9.

Table 9

| Material | Amount |
|---|---|
| Polymeg[1] 2000 | 90 gm. |
| Caprolactam | 214 gm. |
| Santowhite Powder | 1.5 gm. |
| Dimethyl terephthalate | 6.9 gm. |
| Mg (OCH$_3$)$_2$[2] | 1 ml. |
| Trimesoyl tris-caprolactam | 3.2 gm. |
| BMC[3] | 23 ml. |

[1]Polytetramethylene glycol
[2]1 molar in methanol
[3]Bromo magnesium caprolactam — 0.4 molar in caprolactam The caprolactam, Polymeg 2000, and Santowhite Poweder are heated under vacuum to distil 25 gms. caprolactam in order to dry the mixture. A reflux condenser is attached to the reactor with a dry ice-cooled receiver attached to the condenser outlet. Dimethyl terephthalate and Mg (OCH$_3$)$_2$ added to the mixture and the reactor evacuated to reflux caprolactam. Progress of the transesterification reaction is followed by measurement of evolved methanol condensed in the dry ice-cooled receiver. When methanol evolution has stopped, the reactor vacuum is released to nitrogen and 0.5 ml water added to destroy the magnesium methoxide catalyst. The reflux is replaced with a distilling head and the mixture re-evacuated to distil 10 ml. caprolactam to re-dry. Trimesoyl tris-caprolactam is added and dissolved, and the mixture cooled to 100° C. The mixture is cast into a vertical mold (described in Example 1) which has been heated to 100° C. The mixture is cast by means of a metering pump. The BMC catalyst is injected into the stream by means of a second metering pump and the streams mixed by a Kenics static mixer. After casting is complete, the mold is heated to 160° C over a 15 minute period and held at 160° C for an additional 45 minutes, after which the mold is opened and the sample removed.

What we claim is:

1. A lactam-polyol-polyacyl lactam block terpolymer or a lactam polyol-acyl-polylactam block terpolymer having ester end group termination and the general formula:

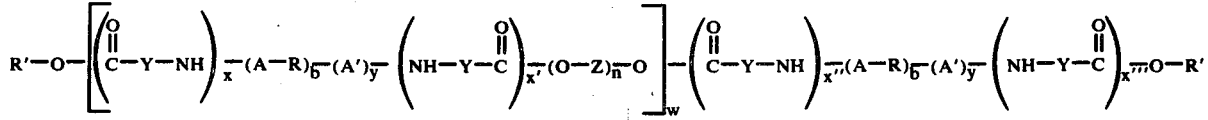

where (O—Z)$_n$ is a polymeric moiety and Z is a hydrocarbon or substituted hydrocarbon group said group being alkylene, arylene, alkylene carbonyl, arylene carbonyl, and mixtures thereof; A and A' are acyl groups selected from $$-\overset{O}{\underset{\|}{C}}-,\ -\overset{S}{\underset{\|}{C}}-,\ -\overset{O}{\underset{\underset{\|}{O}}{\overset{\|}{S}}}-,\ \text{or}\ -\overset{O}{\underset{\|}{P}}-;$$

R is a divalent or polyvalent hydrocarbon group;
Y is an alkylene or substituted alkylene having from about 3 to about 14 carbon atoms; $x$, $x'$, $x''$, and $x'''$ are integers and the total number of $x$'s is equal to $2w + 2$; $n$, $y$, and $w$ are integers equal to one or more, and b is an integer equal to zero or one; and R' is an aliphatic or substituted aliphatic hydrocarbon wherein the ester group is attached to other than an aromatic radical.

2. A block terpolymer according to claim 1 wherein the lactam portion of the terpolymer is formed from a lactam of the formula

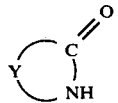

where Y is an alkylene group having at least about 3 carbon atoms.

3. A block terpolymer according to claim 2 wherein the lactam is ε-caprolactam.

4. A block terpolymer according to claim 1 wherein the polyol portion of the terpolymer is formed from an alkylene glycol.

5. A block terpolymer according to claim 1 wherein said alkylene glycol is a polyalkylene glycol having a molecular weight of at least about 1000.

6. A block terpolymer according to claim 5 wherein said polyalkylene glycol is polyethylene glycol.

7. A block terpolymer according to claim 5 wherein said polyalkylene glycol is a polypropylene glycol.

8. A block terpolymer according to claim 5 wherein said polyalkylene glycol is polytetramethylene glycol.

9. A block terpolymer according to claim 1 wherein the polyol portion of the terpolymer is formed from polybutadiene diol.

10. A block terpolymer according to claim 1 wherein the polyol portion of the terpolymer is formed from a polyester.

11. A block terpolymer according to claim 10 wherein said polyester is polycaprolactone diol.

12. A block terpolymer according to claim 1 wherein the acyl groups of all of said ester and amide linkages are carbonyl groups.

13. A copolymer according to claim 1 wherein said block terpolymer is of the repeating AB block structure.

14. A copolymer according to claim 1 wherein said terpolymer is a caprolactam-polyalkylene glycol block polymer with phthaloyl linkages between the blocks.

* * * * *